(12) United States Patent
Nomaru

(10) Patent No.: US 9,085,046 B2
(45) Date of Patent: Jul. 21, 2015

(54) LASER BEAM APPLYING MECHANISM AND LASER PROCESSING APPARATUS

(75) Inventor: Keiji Nomaru, Ota-Ku (JP)

(73) Assignee: Disco Corporation, Tokyo (JP)

( * ) Notice: Subject to any disclaimer, the term of this patent is extended or adjusted under 35 U.S.C. 154(b) by 821 days.

(21) Appl. No.: 13/366,728

(22) Filed: Feb. 6, 2012

(65) Prior Publication Data

US 2012/0199565 A1 Aug. 9, 2012

(30) Foreign Application Priority Data

Feb. 7, 2011 (JP) .................................. 2011-023830

(51) Int. Cl.
*B23K 26/16* (2006.01)
*B23K 26/06* (2014.01)
*B23K 26/067* (2006.01)

(52) U.S. Cl.
CPC ........... *B23K 26/0639* (2013.01); *B23K 26/067* (2013.01); *B23K 26/0643* (2013.01); *B23K 26/0652* (2013.01)

(58) Field of Classification Search
CPC ........... B23K 26/0639; B23K 26/0643; B23K 26/0648; B23K 26/0652; B23K 26/0665; B23K 26/067
USPC ............. 219/121.67, 121.73–121.75, 121.78, 219/121, 79, 121.6, 121.61; 359/362, 386, 359/391, 485.06, 485.07, 489.08, 489.09
See application file for complete search history.

(56) References Cited

U.S. PATENT DOCUMENTS

| | | | | |
|---|---|---|---|---|
| 6,529,454 | B1* | 3/2003 | Asoma et al. | 369/44.12 |
| 8,049,133 | B2* | 11/2011 | Oba et al. | 219/121.65 |
| 2002/0176127 | A1* | 11/2002 | Garner | 359/35 |
| 2004/0164061 | A1* | 8/2004 | Takeuchi et al. | 219/121.73 |
| 2012/0292297 | A1* | 11/2012 | Morikazu et al. | 219/121.72 |
| 2013/0334185 | A1* | 12/2013 | Nomaru | 219/121.82 |

FOREIGN PATENT DOCUMENTS

| | | | |
|---|---|---|---|
| JP | 01-167723 | 7/1989 | |
| JP | 06-003620 | 1/1994 | |
| JP | 08221796 A * | 8/1996 | ............. G11B 7/135 |
| JP | 2002-273583 | 9/2002 | |
| JP | 2003-320466 | 11/2003 | |
| JP | 2005-014059 | 1/2005 | |
| JP | 2005-118832 | 5/2005 | |
| JP | 2008-272794 | 11/2008 | |
| JP | 2010-284670 | 12/2010 | |
| WO | WO2004/021340 A1 | 3/2004 | |

* cited by examiner

*Primary Examiner* — Jianying Atkisson
(74) *Attorney, Agent, or Firm* — Greer Burns & Crain Ltd.

(57) ABSTRACT

A laser beam applying mechanism has a power adjusting unit provided between a laser beam oscillator and a focusing lens. The power adjusting unit includes a half-wave plate, a prism having a first polarization beam splitter film and a second polarization beam splitter film. The optical path is adjusted by a piezoelectric actuator opposed to the first polarization beam splitter film, and a polarized light components synthesizer opposed to the second polarization beam splitter film generates a phase difference (β) between an S polarized light component and a P polarized light component. The phase difference (β) between the S polarized light component and the P polarized light component of the laser beam obtained by the polarized light components synthesizer is in the range of 0° to 180°.

2 Claims, 7 Drawing Sheets

LASER BEAM APPLYING MECHANISM AND LASER PROCESSING APPARATUS

BACKGROUND OF THE INVENTION

1. Field of the Invention

The present invention relates to a laser beam applying mechanism and a laser processing apparatus which can control at high speeds the power of a laser beam oscillated by a laser beam oscillator.

2. Description of the Related Art

In a semiconductor device fabrication process, a plurality of crossing division lines called streets are formed on the front side of a substantially disk-shaped semiconductor wafer to thereby partition a plurality of regions where devices such as ICs and LSIs are respectively formed. The semiconductor wafer is cut along the streets to thereby divide the regions where the devices are formed from each other, thus obtaining the individual semiconductor devices.

Cutting of the semiconductor wafer along the streets is usually performed by using a cutting apparatus called a dicing saw. This cutting apparatus includes a chuck table for holding the semiconductor wafer as a workpiece, cutting means for cutting the semiconductor wafer held on the chuck table, and moving means for relatively moving the chuck table and the cutting means. The cutting means includes a spindle adapted to be rotated at high speeds and a cutting blade mounted on the spindle. The cutting blade is composed of a disk-shaped base and an annular cutting edge mounted on a side surface of the base along the outer circumference thereof. The cutting edge is formed by fixing diamond abrasive grains having a grain size of about 3 µm to the base by electroforming so that the thickness of the cutting edge becomes about 20 µm, for example.

In recent years, a semiconductor wafer intended to improve the processing performance of circuits such as ICs and LSIs has been put into practical use. This semiconductor wafer is composed of a semiconductor substrate such as a silicon wafer and a low-permittivity insulator film (Low-k film) formed on the front side of the semiconductor substrate. Examples of the Low-k film include an inorganic film of SiOF, BSG (SiOB), etc. and an organic film such as a polymer film of polyimide, parylene, etc. However, the Low-k film is formed as a multilayer film (5 to 15 layers) like mica and it is very brittle. Accordingly, when this semiconductor wafer is cut along the streets by using the cutting blade, there arises a problem such that the Low-k film may be separated and this separation may reach the circuits to cause fatal damage to the semiconductor chips. To solve this problem, Japanese Patent Laid-open No. 2003-320466 discloses a processing apparatus for applying a laser beam to the Low-k film along the streets to remove the Low-k film on the streets and next cutting the streets where the Low-k film is now absent by using a cutting blade.

However, in a semiconductor wafer having a configuration such that a plurality of testing metal patterns called test element group (TEG) for testing the function of the circuits are partially provided on the Low-k film in the streets, there is a problem such that the laser beam for removing the Low-k film is blocked by the metal patterns of copper, aluminum, etc., so that the Low-k film cannot be smoothly removed. In the case that the power of the laser beam to be applied to the streets is increased to such an extent that the metal patterns can be removed, there arises a new problem such that the semiconductor substrate forming the streets where only the Low-k film is present may be damaged by the laser beam, causing scattering of debris, and this debris may be deposited to bonding pads or the like connected to the circuits, causing a degradation in quality of the semiconductor chips.

To solve such a problem, Japanese Patent Laid-open No. 2005-118832 discloses a laser processing method of applying a laser beam to an area where the metal patterns are formed and an area where the Low-k film is formed under different processing conditions, thereby removing the metal patterns and the Low-k film.

SUMMARY OF THE INVENTION

However, it is difficult to adjust the power of the laser beam oscillated by a laser beam oscillator in response to a feed speed, so that it is difficult to reliably remove the area where the metal patterns are formed.

It is therefore an object of the present invention to provide a laser beam applying mechanism and a laser processing apparatus which can control at high speeds the power of the laser beam oscillated by a laser beam oscillator.

In accordance with an aspect of the present invention, there is provided a laser beam applying mechanism including a laser beam oscillator for oscillating a laser beam; a focusing lens for focusing the laser beam oscillated by the laser beam oscillator; and power adjusting means provided between the laser beam oscillator and the focusing lens for adjusting the power of the laser beam oscillated by the laser beam oscillator; the power adjusting means including a half-wave plate for 45° rotating the polarization plane of the laser beam of linearly polarized light oscillated by the laser beam oscillator; a prism provided on the emergence side of the half-wave plate and having a first polarization beam splitter film and a second polarization beam splitter film each for reflecting an S polarized light component of the incident laser beam and transmitting a P polarized light component of the incident laser beam; optical path length adjusting means including a first mirror having a mirror surface opposed to the first polarization beam splitter film for reflecting the P polarized light component transmitted through the first polarization beam splitter film and a piezoelectric actuator mounted on the first mirror for adjusting the spacing between the mirror surface of the first mirror and the first polarization beam splitter film according to a voltage applied, thereby generating a first phase difference (α) between the S polarized light component reflected on the first polarization beam splitter film and the P polarized light component reflected on the mirror surface of the first mirror; polarized light components synthesizing means including a second mirror having a mirror surface opposed to the second polarization beam splitter film with a predetermined spacing defined therebetween for reflecting the P polarized light component reflected on the mirror surface of the first mirror and next transmitted through the second polarization beam splitter film, thereby generating a second phase difference (β) between the S polarized light component reflected on the first polarization beam splitter film and next reflected on the second polarization beam splitter film and the P polarized light component transmitted through the second polarization beam splitter film and next reflected on the mirror surface of the second mirror; beam dividing means having a third polarization beam splitter film for dividing the laser beam obtained by the polarized light components synthesizing means into an optical path directed to the focusing lens and an optical path directed to a beam damper; and control means for controlling the voltage to be applied to the piezoelectric actuator of the optical path length adjusting means to thereby adjust the spacing between the mirror surface of the first mirror and the first polarization beam splitter film, thereby controlling a third phase difference (α+β) between the S polarized light component and the P polarized light component of the laser beam obtained by the polarized light components synthesizing means in the range of 0° to 180°.

In accordance with another aspect of the present invention, there is provided a laser processing apparatus including a chuck table having a holding surface for holding a workpiece; a laser beam applying mechanism for applying a laser beam to the workpiece held on the chuck table; feeding means for relatively feeding the chuck table and the laser beam applying mechanism in a feeding direction; and indexing means for relatively indexing the chuck table and the laser beam applying mechanism in an indexing direction perpendicular to the feeding direction; the laser beam applying mechanism including a laser beam oscillator for oscillating a laser beam; a focusing lens for focusing the laser beam oscillated by the laser beam oscillator; and power adjusting means provided between the laser beam oscillator and the focusing lens for adjusting the power of the laser beam oscillated by the laser beam oscillator; the power adjusting means including a half-wave plate for 45° rotating the polarization plane of the laser beam of linearly polarized light oscillated by the laser beam oscillator; a prism provided on the emergence side of the half-wave plate and having a first polarization beam splitter film and a second polarization beam splitter film each for reflecting an S polarized light component of the incident laser beam and transmitting a P polarized light component of the incident laser beam; optical path length adjusting means including a first mirror having a mirror surface opposed to the first polarization beam splitter film for reflecting the P polarized light component transmitted through the first polarization beam splitter film and a piezoelectric actuator mounted on the first mirror for adjusting the spacing between the mirror surface of the first mirror and the first polarization beam splitter film according to a voltage applied, thereby generating a first phase difference ($\alpha$) between the S polarized light component reflected on the first polarization beam splitter film and the P polarized light component reflected on the mirror surface of the first mirror; polarized light components synthesizing means including a second mirror having a mirror surface opposed to the second polarization beam splitter film with a predetermined spacing defined therebetween for reflecting the P polarized light component reflected on the mirror surface of the first mirror and next transmitted through the second polarization beam splitter film, thereby generating a second phase difference ($\beta$) between the S polarized light component reflected on the first polarization beam splitter film and next reflected on the second polarization beam splitter film and the P polarized light component transmitted through the second polarization beam splitter film and next reflected on the mirror surface of the second mirror; beam dividing means having a third polarization beam splitter film for dividing the laser beam obtained by the polarized light components synthesizing means into an optical path directed to the focusing lens and an optical path directed to a beam damper; and control means for controlling the voltage to be applied to the piezoelectric actuator of the optical path length adjusting means to thereby adjust the spacing between the mirror surface of the first mirror and the first polarization beam splitter film, thereby controlling a third phase difference ($\alpha+\beta$) between the S polarized light component and the P polarized light component of the laser beam obtained by the polarized light components synthesizing means in the range of 0° to 180°.

According to the present invention, the voltage to be applied to the piezoelectric actuator constituting the optical path length adjusting means of the power adjusting means in the laser beam applying mechanism is controlled to thereby adjust the spacing between the mirror surface of the first mirror and the first polarization beam splitter film, thereby controlling the third phase difference ($\alpha+\beta$) between the S polarized light component and the P polarized light component of the laser beam obtained by the polarized light components synthesizing means in the range of 0° to 180°. As a result, the power of the laser beam to be applied from the focusing lens can be adjusted. Further, the piezoelectric actuator for adjusting the spacing between the mirror surface of the first mirror and the first polarization beam splitter film expands according to the voltage applied, and a displacement of several μm can be attained, so that high-speed control can be attained. Accordingly, the power of the laser beam to be applied from the focusing lens to the workpiece can be adjusted in response to a feed speed in feeding the workpiece in the laser processing apparatus.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
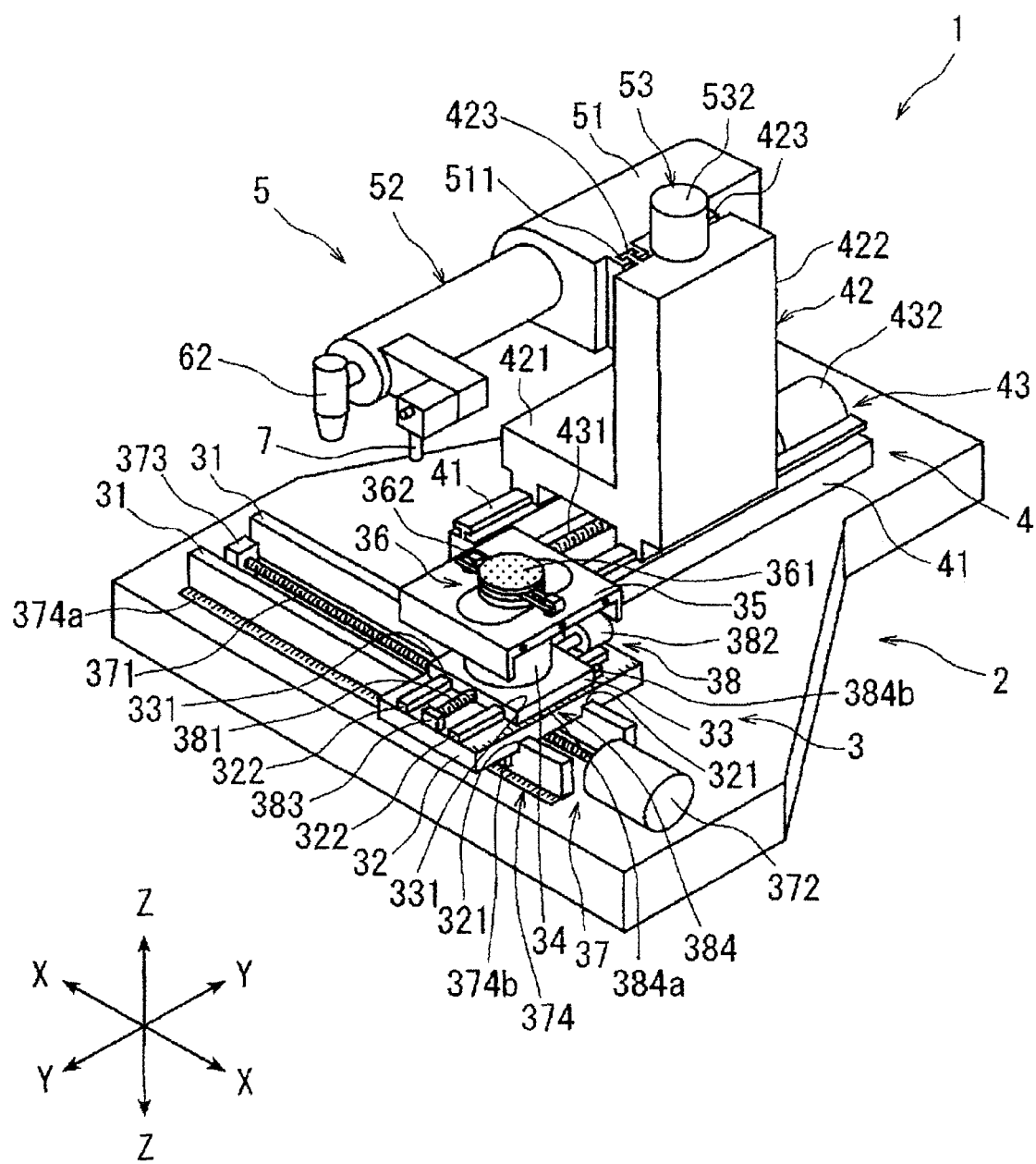
FIG. 1 is a perspective view of a laser processing apparatus according to the present invention.

A preferred embodiment of the laser beam applying mechanism and the laser processing apparatus according to the present invention will now be described in detail with reference to the attached drawings. FIG. 1 is a perspective view of a laser processing apparatus 1 having a laser beam applying mechanism according to a preferred embodiment of the present invention. The laser processing apparatus 1 shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a support table 35 supported by a cylindrical member 34 standing on the second slide block 33, and a chuck table 36 as workpiece holding means. The chuck table 36 has a vacuum chuck 361 formed of a porous material. A workpiece such as a disk-shaped semiconductor wafer is adapted to be held under suction on the upper surface of the vacuum chuck 361 as a holding surface by operating suction means (not shown). The chuck table 36 is rotatable by a pulse motor (not shown) provided in the cylindrical member 34. Further, the chuck table 36 is provided with clamps 362 for fixing an annular frame supporting the workpiece such as a semiconductor wafer through a protective tape.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 further includes feeding means 37 for moving the first slide block 32 in the X direction along the guide rails 31. The feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction along the guide rails 31 by operating the pulse motor 372 to normally or reversely rotate the externally threaded rod 371.

The laser processing apparatus 1 includes feed amount detecting means 374 for detecting the feed amount of the chuck table 36. The feed amount detecting means 374 includes a linear scale 374a extending along one of the guide rails 31 and a read head 374b provided on the first slide block 32 and movable along the linear scale 374a together with the first slide block 32. The read head 374b of the feed amount detecting means 374 transmits a pulse signal of one pulse every one μm in this preferred embodiment to control means which will be hereinafter described. This control means counts the number of pulses as the pulse signal input from the read head 374b to thereby detect the feed amount of the chuck table 36.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 further includes first indexing means 38 for moving the second slide block 33 in the Y direction along the guide rails 322. The first indexing means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction along the guide rails 322 by operating the pulse motor 382 to normally or reversely rotate the externally threaded rod 381.

The laser processing apparatus 1 includes index amount detecting means 384 for detecting the index amount of the chuck table 36. The index amount detecting means 384 includes a linear scale 384a extending along one of the guide rails 322 and a read head 384b provided on the second slide block 33 and movable along the linear scale 384a together with the second slide block 33. The read head 384b of the index amount detecting means 384 transmits a pulse signal of one pulse every one μm in this preferred embodiment to the control means to be described later. This control means counts the number of pulses as the pulse signal input from the read head 384b to thereby detect the index amount of the chuck table 36.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 422 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 further includes second indexing means 43 for moving the movable support base 42 in the Y direction along the guide rails 41. The second indexing means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the Y direction along the guide rails 41 by operating the pulse motor 432 to normally or reversely rotate the externally threaded rod 431.

The laser processing apparatus 1 further includes focal position adjusting means 53 for moving the laser beam applying unit 5 along the guide rails 423 provided on the vertical portion 422 of the movable support base 42 in the Z direction, i.e., in the direction perpendicular to the holding surface of the chuck table 36. The focal position adjusting means 53 includes an externally threaded rod (not shown) extending parallel to the guide rails 423 so as to be interposed therebetween and a pulse motor 532 as a drive source for rotationally driving this externally threaded rod. Accordingly, the laser beam applying unit 5 is moved in the Z direction along the guide rails 423 by operating the pulse motor 532 to normally or reversely rotate this externally threaded rod. In this preferred embodiment, when the pulse motor 532 is normally operated, the laser beam applying unit 5 is moved upward, whereas when the pulse motor 532 is reversely operated, the laser beam applying unit 5 is moved downward.

The laser beam applying unit 5 includes a unit holder 51 and a cylindrical unit housing 52 mounted to the unit holder 51. The unit holder 51 is formed with a pair of guided grooves 511 for slidably engaging the pair of guide rails 423 provided on the vertical portion 422 of the movable support base 42. Accordingly, the unit holder 51 is supported to the movable support base 42 so as to be movable in the Z direction along the guide rails 423 by the slidable engagement of the guided grooves 511 with the guide rails 423. The unit housing 52 mounted to the unit holder 51 is provided with a laser beam applying mechanism for applying a laser beam to the workpiece held on the chuck table 36. A first preferred embodiment of the laser beam applying mechanism will now be described with reference to FIG. 2.

Figure 2:
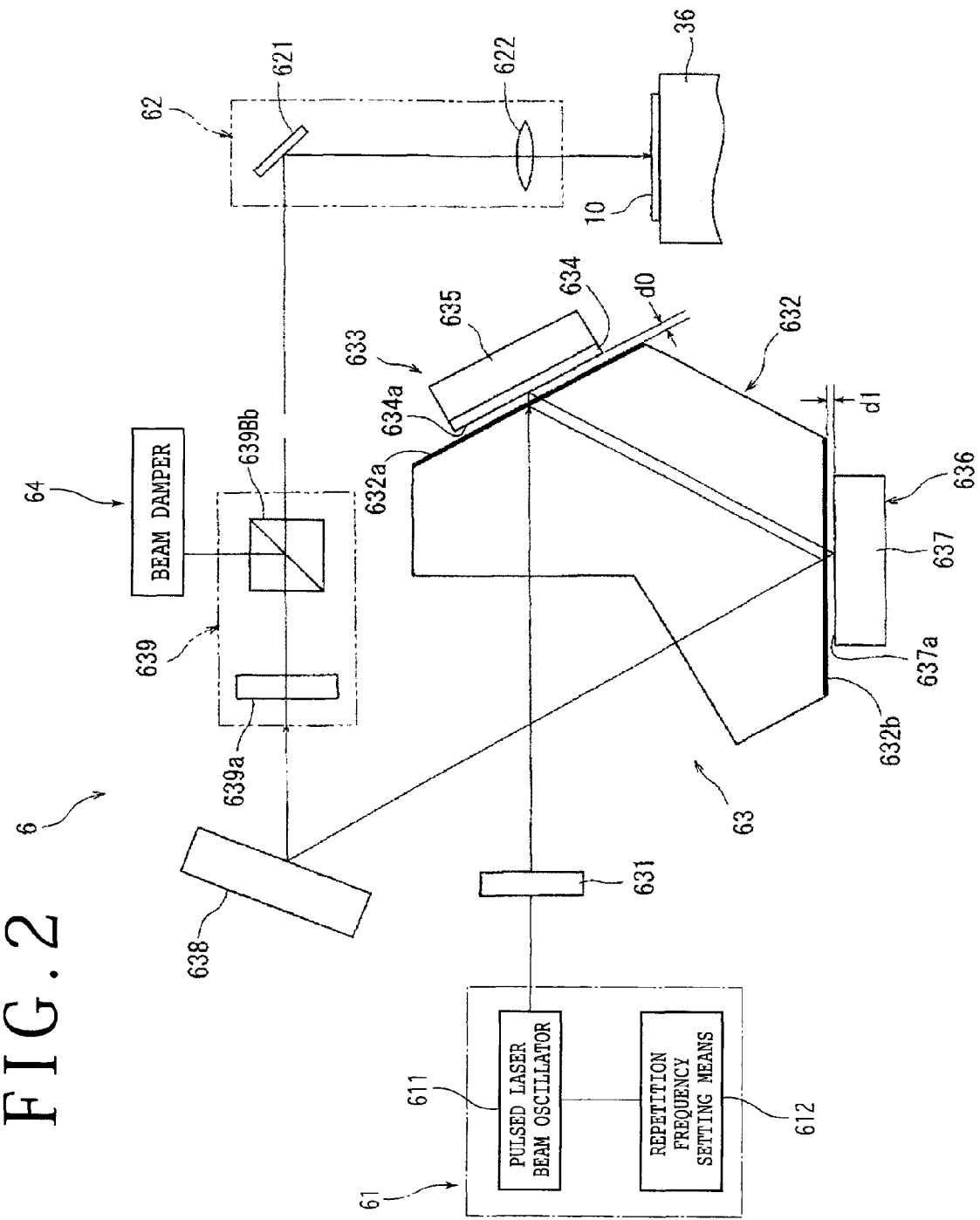
FIG. 2 is a block diagram showing a first preferred embodiment of a laser beam applying mechanism included in the laser processing apparatus shown in FIG. 1.

Referring to FIG. 2, there is schematically shown a laser beam applying mechanism 6 according to the first preferred embodiment. The laser beam applying mechanism 6 includes pulsed laser beam oscillating means 61 for oscillating a pulsed laser beam, focusing means 62 for focusing the laser beam oscillated by the pulsed laser beam oscillating means 61 and applying this pulsed laser beam to the workpiece held on the chuck table 36, and power adjusting means 63 provided between the pulsed laser beam oscillating means 61 and the focusing means 62 for adjusting the power of the pulsed laser beam oscillated by the pulsed laser beam oscillating means 61. The pulsed laser beam oscillating means 61 is composed of a pulsed laser beam oscillator 611 provided by a YAG laser oscillator or a YVO4 laser oscillator and repetition frequency setting means 612 connected to the pulsed laser beam oscillator 611. For example, the pulsed laser beam oscillating means 61 oscillates a pulsed laser beam having a wavelength of 355 nm. The focusing means 62 includes a direction changing mirror 621 for changing the traveling direction of the pulsed laser beam oscillated by the pulsed laser beam oscillating means 61 and next adjusted in power by the power adjusting means 63 to a downward direction as viewed in FIG. 2 and a focusing lens 622 for focusing the pulsed laser beam reflected by the direction changing mirror 621. The pulsed laser beam focused by the focusing lens 622 is applied to the workpiece held on the holding surface of the chuck table 36. The focusing means 62 is provided at the front end of the unit housing 52 as shown in FIG. 1.

The power adjusting means 63 for adjusting the power of the pulsed laser beam oscillated by the pulsed laser beam oscillating means 61 includes a half-wave plate 631 for 45° rotating the polarization plane of the pulsed laser beam of linearly polarized light oscillated by the pulsed laser beam oscillating means 61, a prism 632 provided on the emergence side of the half-wave plate 631 and having a first polarization beam splitter film 632a and a second polarization beam splitter film 632b each for reflecting an S polarized light component of the incident pulsed laser beam and transmitting a P polarized light component of the incident pulsed laser beam, optical path length adjusting means 633 opposed to the first polarization beam splitter film 632a of the prism 632, and polarized light components synthesizing means 636 opposed to the second polarization beam splitter film 632b of the prism 632.

The half-wave plate 631 functions to 45° rotate the polarization plane of the pulsed laser beam of linearly polarized light oscillated by the pulsed laser beam oscillating means 61 with respect to the first polarization beam splitter film 632a, thereby adjusting the intensity distribution of light so that the P polarized light component and the S polarized light component are uniform in intensity. Each of the first polarization beam splitter film 632a and the second polarization beam splitter film 632b of the prism 632 functions to reflect the S polarized light component of the laser beam of linearly polarized light whose polarization plane has been rotated 45° by the half-wave plate 631 and transmit the P polarized light component of this laser beam. The optical path length adjusting means 633 is composed of a first mirror 634 having a mirror surface 634a opposed to the first polarization beam splitter film 632a and a piezoelectric actuator 635 mounted on the back surface of the first mirror 634. The first mirror 634 functions to reflect the P polarized light component transmitted through the first polarization beam splitter film 632a of the prism 632. The piezoelectric actuator 635 is configured by a piezoelectric element expanding according to a voltage applied, and is controlled by the control means to be described later.

The optical path length adjusting means 633 as configured above functions to adjust the spacing (d0) between the mirror surface 634a of the first mirror 634 and the first polarization beam splitter film 632a according to a voltage applied to the piezoelectric actuator 635, thereby generating a phase difference ($\alpha$) between the S polarized light component reflected on the first polarization beam splitter film 632a and the P polarized light component reflected on the mirror surface 634a of the first mirror 634. The polarized light components synthesizing means 636 is configured by a second mirror 637 having a mirror surface 637a opposed to the second polarization beam splitter film 632b of the prism 632 with a predetermined spacing (d1) defined therebetween. The mirror surface 637a of the second mirror 637 functions to reflect the P polarized light component reflected on the mirror surface 634a of the first mirror 634 and next transmitted through the second polarization beam splitter film 632b. The polarized light components synthesizing means 636 configured by the second mirror 637 functions to generate a phase difference ($\beta$) between the S polarized light component reflected on the first polarization beam splitter film 632a and next reflected on the second polarization beam splitter film 632b and the P polarized light component transmitted through the second polarization beam splitter film 632b and next reflected on the mirror surface 637a of the second mirror 637 and to synthesize the S polarized light component and the P polarized light component.

The power adjusting means 63 further includes a direction changing mirror 638 for changing the traveling direction of the laser beam emerging from the prism 632 which laser beam has been obtained by synthesizing the S polarized light component reflected on the second polarization beam splitter film 632b and the P polarized light component transmitted through the second polarization beam splitter film 632b and next reflected on the mirror surface 637a of the second mirror 637. The power adjusting means 63 further includes beam dividing means 639 for dividing the laser beam reflected on the direction changing mirror 638. The beam dividing means 639 is composed of a half-wave plate 639a and a polarization beam splitter 639b having a polarization beam splitter film. The half-wave plate 639a functions to 45° rotate the polarization plane of the laser beam emerging from the prism 632, thereby restoring the original polarization plane. The polarization beam splitter 639b having the polarization beam splitter film functions to reflect the S polarized light component of the laser beam emerging from the half-wave plate 639a and next introduce it into a beam damper 64, while transmitting the P polarized light component and next introducing it into the focusing means 62. While the beam dividing means 639 shown in FIG. 2 is composed of the half-wave plate 639a and the polarization beam splitter 639b having the polarization beam splitter film, the polarization beam splitter film of the polarization beam splitter 639b may be rotated 45° without using the half-wave plate 639a.

There will now be described the principle of power adjustment by the power adjusting means 63 of the laser beam applying mechanism 6. A phase difference (α+β) is generated between the S polarized light component reflected on the first polarization beam splitter film 632a and next reflected on the second polarization beam splitter film 632b in the prism 632 and the P polarized light component transmitted through the first polarization beam splitter film 632a, next reflected on the mirror surface 634a of the first mirror 634, next transmitted through the second polarization beam splitter film 632b, and next reflected on the mirror surface 637a of the second mirror 637. The S polarized light component and the P polarized light component thus having the phase difference (α+β) are output toward the beam dividing means 639. When the S polarized light component and the P polarized light component having the phase difference (α+β) with respect to the S polarized light component are synthesized by the polarized light components synthesizing means 636, the polarization characteristics of the laser beam differ according to the value for the phase difference (α+β). That is, in the case that the phase difference (α+β) is 0°, only the P polarized light component is incident on the polarization beam splitter film of the polarization beam splitter 639b, so that the whole of the laser beam is transmitted through the polarization beam splitter 639b and introduced into the focusing means 62.

In the case that the phase difference (α+β) is 180°, only the S polarized light component is incident on the polarization beam splitter film of the polarization beam splitter 639b, so that the whole of the laser beam is reflected on the polarization beam splitter film of the polarization beam splitter 639b and introduced into the beam damper 64. When the phase difference (α+β) changes from 0° to 180°, the P polarized light component of the laser beam is gradually decreased. Accordingly, by controlling the phase difference (α+β) between 0° and 180°, the proportion of the P polarized light component of the laser beam, i.e., the power of the laser beam to be applied through the focusing means 62 to the workpiece can be adjusted. The control of the phase difference (α+β) can be achieved by controlling the voltage to be applied to the piezoelectric actuator 635 constituting the optical path length adjusting means 633 to thereby adjust the spacing (d0) between the mirror surface 634a of the first mirror 634 and the first polarization beam splitter film 632a. As described above, the piezoelectric actuator 635 constituting the optical path length adjusting means 633 is configured by a piezoelectric element expanding according to a voltage applied, and can attain a displacement of several μm and a resonance frequency of greater than 300 kHz. Thus, the piezoelectric actuator 635 has excellent responsivity and can be controlled at high speeds.

Figure 3:
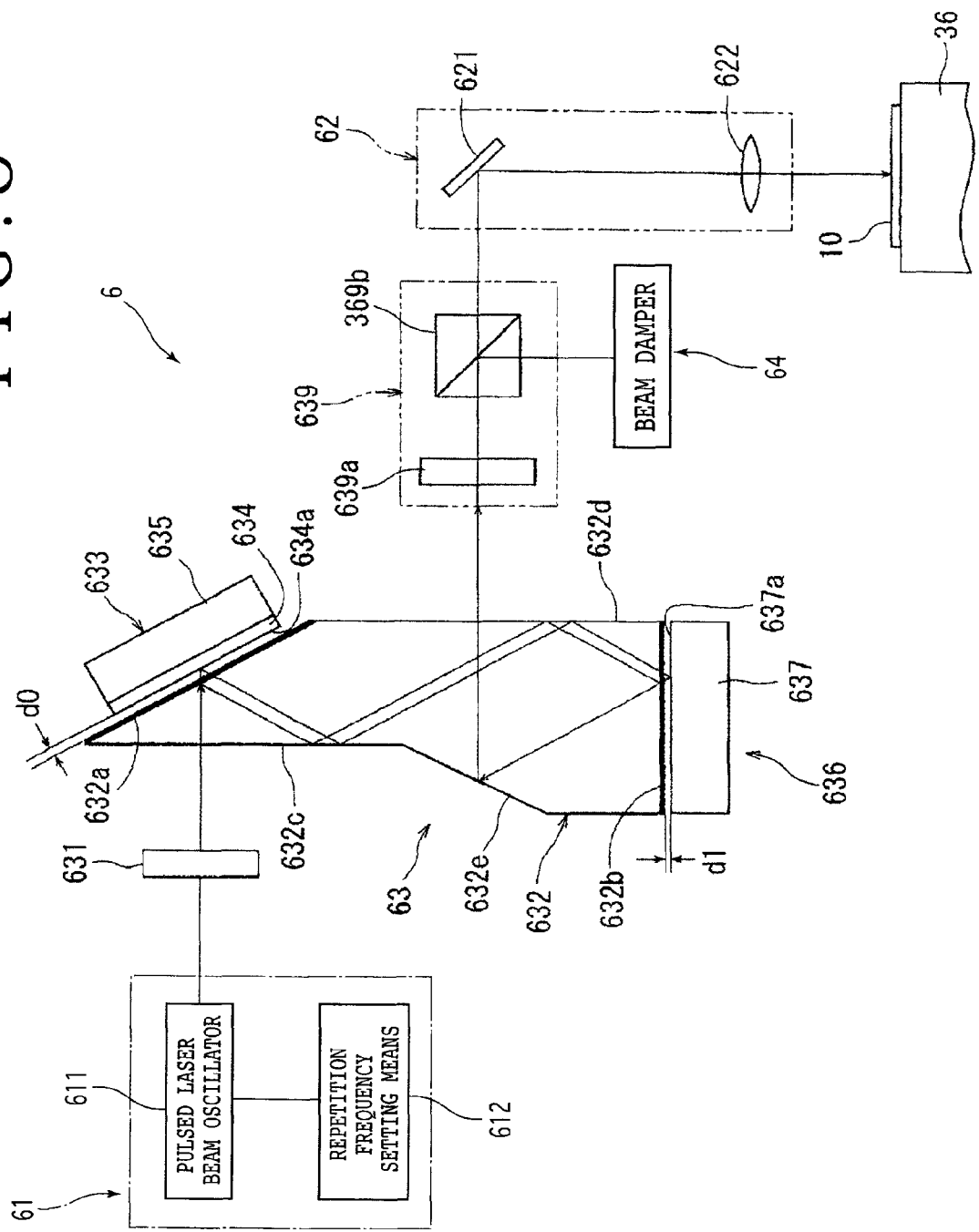
FIG. 3 is a block diagram showing a second preferred embodiment of the laser beam applying mechanism according to the present invention.

Referring next to FIG. 3, there is schematically shown a laser beam applying mechanism 6 according to a second preferred embodiment of the present invention. The laser beam applying mechanism 6 shown in FIG. 3 is different from the laser beam applying mechanism 6 shown in FIG. 2 in only the power adjusting means 63. More specifically, the power adjusting means 63 shown in FIG. 3 is different from the power adjusting means 63 shown in FIG. 2 in only the shape of the prism 632, and the other configuration is substantially the same as that shown in FIG. 2. Accordingly, the same parts are denoted by the same reference numerals and the explanation thereof will be omitted herein. The prism 632 of the power adjusting means 63 shown in FIG. 3 includes three reflective surfaces 632c, 632d and 632e in addition to the first polarization beam splitter film 632a and the second polarization beam splitter film 632b. A laser beam of linearly polarized light is oscillated by the pulsed laser beam oscillating means 61 and the polarization plane of the laser beam is next rotated 45° by the half-wave plate 631. The laser beam next enters the prism 632, wherein the S polarized light component is reflected on the first polarization beam splitter film 632a, next reflected on the reflective surface 632c, and next reflected on the reflective surface 632d to reach the second polarization beam splitter film 632b.

On the other hand, the P polarized light component of the laser beam incident on the prism 632 is transmitted through the first polarization beam splitter film 632a, next reflected on the mirror surface 634a of the first mirror 634 constituting the optical path length adjusting means 633, next reflected on the reflective surface 632c, and next reflected on the reflective surface 632d to reach the second polarization beam splitter film 632b. The S polarized light component that has reached the second polarization beam splitter film 632b is reflected on the second polarization beam splitter film 632b toward the reflective surface 632e. On the other hand, the P polarized light component that has reached the second polarization beam splitter film 632b is transmitted through the second polarization beam splitter film 632b and next reflected on the mirror surface 637a of the second mirror 637. The P polarized light component is next synthesized with the S polarized light component to reach the reflective surface 632e.

The laser beam as the synthesis of the S polarized light component and the P polarized light component is reflected on the reflective surface 632e to emerge from the prism 632 toward the beam dividing means 639. As similar to the first preferred embodiment shown in FIG. 2, a phase difference (α+β) is generated between the S polarized light component and the P polarized light component of the laser beam reflected plural times in the prism 632 and emerging therefrom. That is, the phase difference (α+β) is generated between the S polarized light component reflected on the first polarization beam splitter film 632a, the reflective surfaces 632c and 632d, and the second polarization beam splitter film 632b and the P polarized light component transmitted through the first polarization beam splitter film 632a, next reflected on the mirror surface 634a of the first mirror 634 and the reflective surfaces 632c and 632d, next transmitted through the second polarization beam splitter film 632b, and next reflected on the mirror surface 637a of the second mirror 637.

Referring again to FIG. 1, imaging means 7 is provided at the front end portion of the unit housing 52 constituting the laser beam applying unit 5. The imaging means 7 includes illuminating means for illuminating the workpiece, an optical system for capturing an area illuminated by the illuminating means, and an imaging device (CCD) for imaging the area captured by the optical system. An image signal output from the imaging means 7 is transmitted to the control means to be described later.

Figure 4:
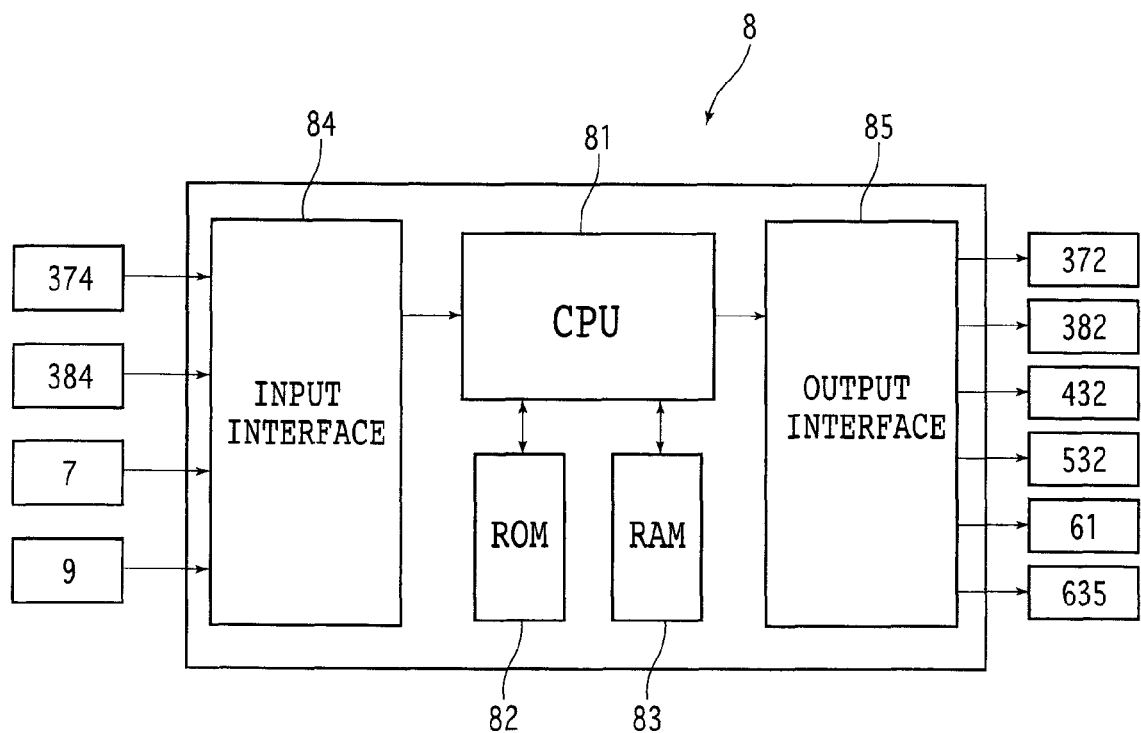
FIG. 4 is a block diagram of control means included in the laser processing apparatus shown in FIG. 1.

The laser processing apparatus 1 includes control means 8 shown in FIG. 4. The control means 8 is configured by a microcomputer, and it includes a central processing unit (CPU) 81 for performing operational processing according to a control program, a read only memory (ROM) 82 preliminarily storing the control program, a random access memory (RAM) 83 for storing the results of computation, etc., an input interface 84, and an output interface 85. Detection signals from the feed amount detecting means 374, the index amount detecting means 384, and the imaging means 7 are input into the input interface 84 of the control means 8. Information of the workpiece or the like is also input from input means 9. On the other hand, control signals are output from the output interface 85 of the control means 8 to the pulse motor 372 of the feeding means 37, the pulse motor 382 of the first indexing means 38, the pulse motor 432 of the second indexing means 43, the pulse motor 532 of the focal position adjusting means 53, the pulsed laser beam oscillating means 61 of the laser beam applying mechanism 6, and the piezoelectric actuator 635 constituting the optical path length adjusting means 633 of the power adjusting means 63.

Figure 5:
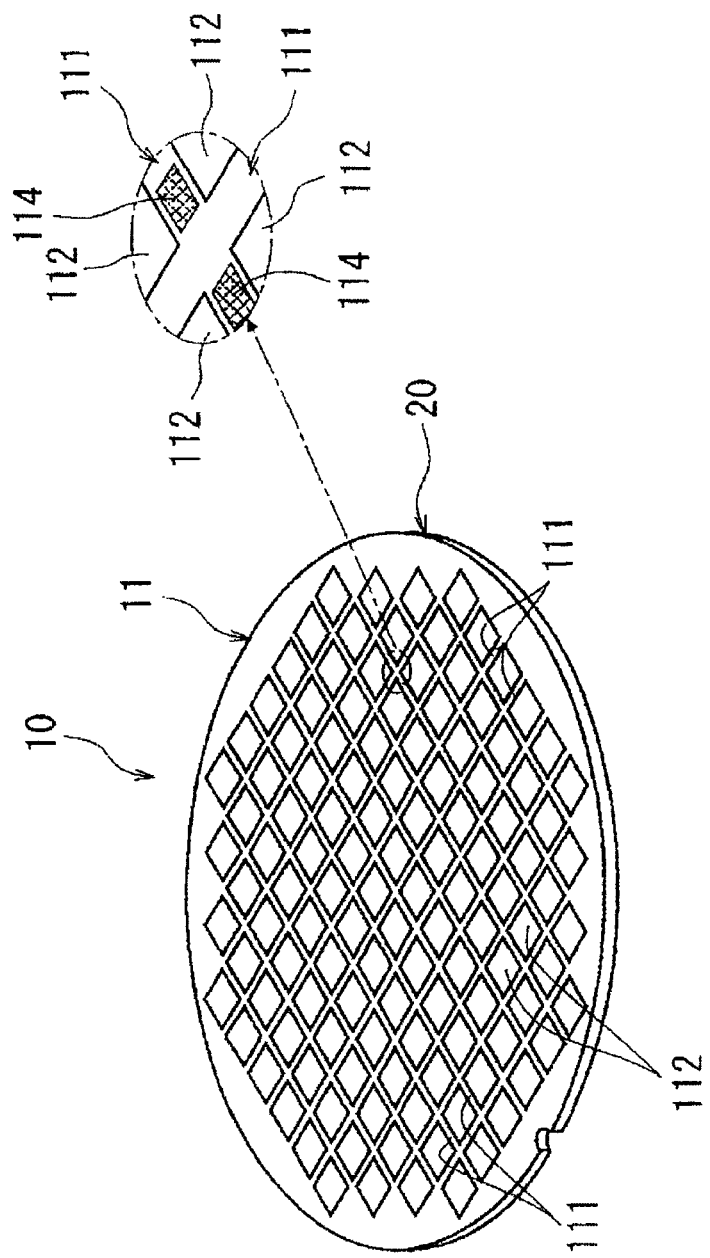
FIG. 5 is a perspective view of a semiconductor wafer as a workpiece.
Figure 6:
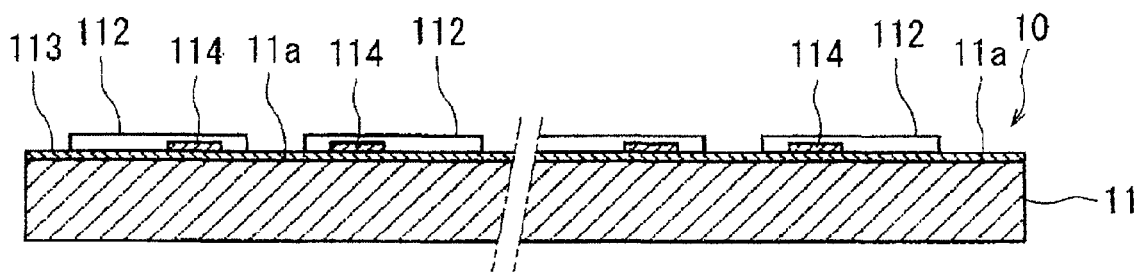
FIG. 6 is an enlarged sectional view of the semiconductor wafer shown in FIG. 5.

The operation of the laser processing apparatus 1 configured above will now be described. FIG. 5 is a perspective view of a semiconductor wafer 10 to be processed by the laser processing apparatus 1, and FIG. 6 is an enlarged sectional view of the semiconductor wafer 10 cut along a street 111 shown in FIG. 5. The semiconductor wafer 10 shown in FIGS. 5 and 6 is formed from a semiconductor substrate 11 such as a silicon wafer. A plurality of crossing streets (division lines) 111 are formed on the front side 11a of the semiconductor substrate 11, thereby partitioning a plurality of rectangular regions where a plurality of devices 112 such as ICs and LSIs are respectively formed. Further, a low-permittivity insulator film 113 is formed on the front side 11a of the semiconductor substrate 11, and a plurality of testing metal patterns 114 called test element group (TEG) for testing the function of the devices 112 are partially provided in the streets 111. Coordinate values in designing each street 111 and each metal pattern 114 of the semiconductor wafer 10 configured above are input from the input means 9 into the control means 8. The coordinate values input into the control means 8 are stored in the random access memory (RAM) 83.

There will now be described a method of applying a laser beam to the semiconductor wafer 10 along the streets 111 to thereby remove the low-permittivity insulator film 113 and the metal patterns 114 in the streets 111. The semiconductor wafer 10 is placed on the vacuum chuck 361 of the chuck table 36 constituting the chuck table mechanism 3 of the laser processing apparatus 1 shown in FIG. 1 in the condition where the front side of the semiconductor wafer 10 is oriented upward. In this condition, the suction means (not shown) is operated to thereby hold the semiconductor wafer 10 on the vacuum chuck 361 under suction. After holding the semiconductor wafer 10 on the chuck table 36 under suction as mentioned above, the control means 8 operates the feeding means 37 to move the chuck table 36 holding the semiconductor wafer 10 under suction to a position directly below the imaging means 7.

In the condition where the chuck table 36 is positioned directly below the imaging means 7, the control means 8 operates the imaging means 7 to perform an alignment operation for detecting a subject area of the semiconductor wafer 10 to be laser-processed. More specifically, the imaging means 7 and the control means 8 perform image processing such as pattern matching for making the alignment of the streets 111 extending in a first direction on the semiconductor wafer 10 and the focusing means 62 of the laser beam applying mechanism 6 for applying the laser beam along the streets 111, thus performing the alignment of a laser beam applying position. The imaging means 7 and the control means 8 similarly perform the alignment operation for the other streets 111 extending in a second direction perpendicular to the first direction mentioned above on the semiconductor wafer 10.

Figure 7A:
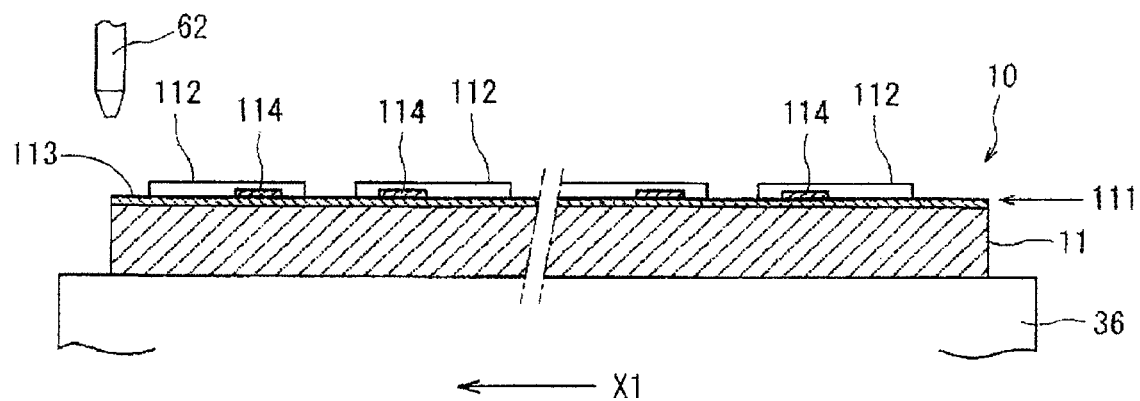
FIGS. 7A and 7B are sectional views for illustrating a laser beam applying step to be performed to the semiconductor wafer shown in FIGS. 5 and 6 by using the laser processing apparatus shown in FIG. 1.

After performing the alignment operation to detect all of the streets 111 formed on the semiconductor wafer 10 held on the chuck table 36, the control means 8 operates the feeding means 37 to move the chuck table 36 to a position where one end (left end as viewed in FIG. 7A) of a predetermined one of the streets 111 extending in the first direction is positioned directly below the focusing means 62 of the laser beam applying mechanism 6 as shown in FIG. 7A. Thereafter, the control means 8 outputs a control signal to the pulsed laser beam oscillating means 61 to apply a pulsed laser beam having an absorption wavelength (355 nm, for example) to the low-permittivity insulator film 113 and the metal patterns 114 at a predetermined repetition frequency (30 kHz, for example) from the focusing means 62 to the semiconductor wafer 10, and the chuck table 36 is moved in the direction shown by an arrow X1 in FIG. 7A at a predetermined feed speed (200 mm/s, for example) (laser beam applying step). In this laser beam applying step, the control means 8 inputs a detection signal from the feed amount detecting means 374 and controls the power of the laser beam to be applied from the focusing means 62 every time the coordinate values for the metal patterns 114 stored in the random access memory (RAM) 83 come into coincidence with those of the position directly below the focusing means 62. The focused spot diameter of the pulsed laser beam to be focused by the focusing means 62 is set to 9.2 µm, for example.

In the laser beam applying step mentioned above, the pulsed laser beam having a power capable of removing the low-permittivity insulator film 113 is applied to an area where the metal patterns 114 are absent, and the pulsed laser beam having a power capable of removing both the metal patterns 114 and the low-permittivity insulator film 113 is applied to an area where the metal patterns 114 are present. For example, in processing the area where the metal patterns 114 are present, the control means 8 controls the voltage to be applied to the piezoelectric actuator 635 constituting the optical path length adjusting means 633 of the power adjusting means 63 in the laser beam applying mechanism 6 so that the phase difference ($\alpha+\beta$) between the S polarized light component and the P polarized light component of the laser beam emerging from the prism 632 becomes 0°. As a result, the laser beam emerging from the prism 632 toward the polarization beam splitter 639b having the polarization beam splitter film becomes only the P polarized light component, so that the whole of the laser beam is transmitted through the polarization beam splitter 639b to reach the focusing means 62. In this preferred embodiment, the power of the laser beam thus introduced into the focusing means 62 is set to 3 W, for example.

On the other hand, in processing the area where the metal patterns 114 are absent, the pulsed laser beam having a power (e.g., 1 W) capable of removing only the low-permittivity insulator film 113 is applied. That is, the control means 8 controls the voltage to be applied to the piezoelectric actuator 635 constituting the optical path length adjusting means 633 of the power adjusting means 63 in the laser beam applying mechanism 6 so that the phase difference ($\alpha+\beta$) between the S polarized light component and the P polarized light component of the laser beam emerging from the prism 632 becomes 120°, for example. As a result, the power of the P polarized light component of the laser beam entering the polarization beam splitter film of the polarization beam splitter 639b becomes 1 W, for example (the proportion of the P polarized light component to the whole of the laser beam becomes ⅓ in power). Accordingly, ⅔ of the laser beam emerging from the prism 632 toward the polarization beam splitter 639b becomes the S polarized light component, and ⅓ of this laser beam becomes the P polarized light component. As a result, the S polarized light component having ⅔ of the power of the laser beam emerging from the prism 632 is reflected by the polarization beam splitter 639b to reach the beam damper 64, whereas the P polarized light component having ⅓ of the power of the laser beam emerging from the prism 632 is transmitted through the polarization beam splitter 639b to reach the focusing means 62. For example, the pulsed laser beam having a power of 1 W is applied to the semiconductor wafer 10 as a workpiece.

Figure 7B:
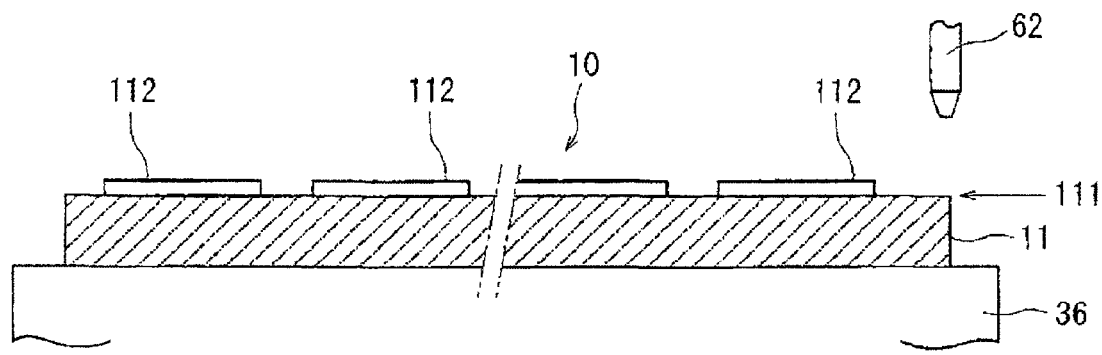

When the laser beam applying step is performed as mentioned above and the other end (right end as viewed in FIG. 7B) of the predetermined street 111 reaches the position directly below the focusing means 62 as shown in FIG. 7B, the application of the pulsed laser beam is stopped. As a result, the metal patterns 114 and the low-permittivity insulator film 113 are removed along the predetermined street 111 on the semiconductor wafer 10 as shown in FIG. 7B. As described above, in the laser beam applying step, the power of the laser beam to be applied to the area where the metal patterns 114 are present is set to 3 W, for example, and the power of the laser beam to be applied to the area where the metal patterns 114 are absent is set to 1 W, for example. Accordingly, in the area where the metal patterns 114 are present, both the metal patterns 114 and the low-permittivity insulator film 113 can be reliably removed, whereas in the area where the metal patterns 114 are absent, only the low-permittivity insulator film 113 can be removed. As described above, the control of the power of the laser beam to be applied to the semiconductor wafer 10 as a workpiece can be achieved by controlling the voltage to be applied to the piezoelectric actuator 635 constituting the optical path length adjusting means 633 to thereby adjust the spacing (d0) between the mirror surface 634a of the first mirror 634 and the first polarization beam splitter film 632a. Accordingly, high-speed control can be attained to thereby control the power of the laser beam in response to the feed speed.

After performing the laser beam applying step along the predetermined street 111 extending in the first direction as mentioned above, the control means 8 operates the first indexing means 38 to index the chuck table 36, or the semiconductor wafer 10 held on the chuck table 36 in the Y direction by the pitch of the streets 111 (indexing step), and the laser beam applying step is similarly performed along the next street 111 extending in the first direction. After performing the laser beam applying step along all of the streets 111 extending in the first direction, the chuck table 36 is rotated 90° to similarly perform the laser beam applying step along all of the other streets 111 extending in the second direction perpendicular to the first direction, thereby removing the metal patterns 114 and the low-permittivity insulator film 113 formed in all of the crossing streets 111 on the semiconductor wafer 10.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser beam applying mechanism comprising:
a laser beam oscillator for oscillating a laser beam;
a focusing lens for focusing said laser beam oscillated by said laser beam oscillator; and
a power adjuster provided between said laser beam oscillator and said focusing lens for adjusting the power of said laser beam oscillated by said laser beam oscillator;
said power adjuster including
a half-wave plate for 45° rotating the polarization plane of said laser beam of linearly polarized light oscillated by said laser beam oscillator,
a prism provided on the emergence side of said half-wave plate and having a first polarization beam splitter film and a second polarization beam splitter film each for reflecting an S polarized light component of said incident laser beam and transmitting a P polarized light component of said incident laser beam,
an optical path length adjuster including a first mirror having a mirror surface opposed to said first polarization beam splitter film for reflecting the P polarized light component transmitted through said first polarization beam splitter film and a piezoelectric actuator mounted on said first mirror for adjusting the spacing between said mirror surface of said first mirror and said first polarization beam splitter film according to a voltage applied, thereby generating a first phase difference ($\alpha$) between the S polarized light component reflected on said first polarization beam splitter film and the P polarized light component reflected on said mirror surface of said first mirror,
a polarized light component synthesizer including a second mirror having a mirror surface opposed to said second polarization beam splitter film with a predetermined spacing defined therebetween for reflecting the P polarized light component reflected on said mirror surface of said first mirror and next transmitted through said second polarization beam splitter film, thereby generating a second phase difference ($\beta$) between the S polarized light component reflected on said first polarization beam splitter film and next reflected on said second polarization beam splitter film and the P polarized light component transmitted through said second polarization beam splitter film and next reflected on said mirror surface of said second mirror,
a beam divider having a third polarization beam splitter film for dividing the laser beam obtained by said polarized light component synthesizer into an optical path directed to said focusing lens and an optical path directed to a beam damper, and
controller for controlling the voltage to be applied to said piezoelectric actuator of said optical path length adjuster to thereby adjust the spacing between said mirror surface of said first mirror and said first polarization beam splitter film, thereby controlling a third phase difference ($\alpha+\beta$) between the S polarized light component and the P polarized light component of the laser beam obtained by said polarized light component synthesizer in the range of 0° to 180°.

2. A laser processing apparatus comprising:
a chuck table having a holding surface for holding a workpiece;
a laser beam applying mechanism for applying a laser beam to said workpiece held on said chuck table;
a feeder for relatively feeding said chuck table and said laser beam applying mechanism in a feeding direction; and
an indexing unit for relatively indexing said chuck table and said laser beam applying mechanism in an indexing direction perpendicular to said feeding direction,
said laser beam applying mechanism including
a laser beam oscillator for oscillating a laser beam,
a focusing lens for focusing said laser beam oscillated by said laser beam oscillator, and
a power adjuster provided between said laser beam oscillator and said focusing lens for adjusting the power of said laser beam oscillated by said laser beam oscillator,
said power adjuster including
a half-wave plate for 45° rotating the polarization plane of said laser beam of linearly polarized light oscillated by said laser beam oscillator, a prism provided on the emergence side of said half-wave plate and having a first polarization beam splitter film and a second polarization beam splitter film each for reflecting an S polarized light component of said incident laser beam and transmitting a P polarized light component of said incident laser beam, an optical path length adjuster including a first mirror having a mirror surface opposed to said first polarization beam splitter film for reflecting the P polarized light component transmitted through said first polarization beam splitter film and a piezoelectric actuator mounted on said first mirror for adjusting the spacing between said mirror surface of said first mirror and said first polarization beam splitter film according to a voltage applied, thereby generating a first phase difference ($\alpha$) between the S polarized light component reflected on said first polarization beam splitter film and the P polarized light component reflected on said mirror surface of said first mirror, a polarized light component synthesizer including a second mirror having a mirror surface opposed to said second polarization beam splitter film with a predetermined spacing defined therebetween for reflecting the P polarized light component reflected on said mirror surface of said first mirror and next transmitted through said second polarization beam splitter film, thereby generating a second phase difference ($\beta$) between the S polarized light component reflected on said first polarization beam splitter film and next reflected on said second polarization beam splitter film and the P polarized light component transmitted through said second polarization beam splitter film and next reflected on said mirror surface of said second mirror, a beam divider having a third polarization beam splitter film for dividing the laser beam obtained by said polarized light component synthesizer into an optical path directed to said focusing lens and an optical path directed to a beam damper, and controller for controlling the voltage to be applied to said piezoelectric actuator of said optical path length ajuster to thereby adjust the spacing between said mirror surface of said first mirror and said first polarization beam splitter film, thereby controlling a third phase difference ($\alpha+\beta$) between the S polarized light component and the P polarized light component of the laser beam obtained by said polarized light component synthesizer in the range of 0° to 180°.

* * * * *